United States Patent
Hall et al.

(10) Patent No.: US 7,457,459 B2
(45) Date of Patent: Nov. 25, 2008

(54) MONOCHROME AND COLOR TRANSFER

(75) Inventors: Ronald L. Hall, Boise, ID (US); Phil Dilmore, Boise, ID (US); James R. Nottingham, Boise, ID (US); Dee L. Chou, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 860 days.

(21) Appl. No.: 10/721,688

(22) Filed: Nov. 25, 2003

(65) Prior Publication Data

US 2005/0111728 A1    May 26, 2005

(51) Int. Cl.
   *G06K 9/00* (2006.01)
(52) U.S. Cl. .................................... 382/162; 382/167

(58) Field of Classification Search ................ 382/162, 382/163, 167, 302, 303; 358/529
See application file for complete search history.

(56) References Cited

U.S. PATENT DOCUMENTS

| | | | |
|---|---|---|---|
| 4,682,216 A * | 7/1987 | Sasaki et al. ............. 358/529 |
| 5,220,417 A * | 6/1993 | Sugiura .................... 358/515 |
| 5,572,599 A | 11/1996 | Tse |
| 5,582,742 A | 12/1996 | Wilkie et al. |
| 5,774,654 A | 6/1998 | Maki |
| 5,917,503 A | 6/1999 | Zakharia et al. |
| 6,002,814 A | 12/1999 | Chadez |
| 6,125,200 A | 9/2000 | Wornock |
| 6,292,200 B1 | 9/2001 | Bowen et al. |
| 2003/0007703 A1 | 1/2003 | Roylance |

* cited by examiner

*Primary Examiner*—Duy M Dang

(57) ABSTRACT

Apparatuses, systems, and methods are provided for processing data. In one method embodiment, the method includes defining a number of color channels, each channel to transfer a particular color element of a stream of color type pixel data. The method can also include identifying monochrome type pixel data within a data stream and allocating a color channel to transfer the identified monochrome type pixel data.

24 Claims, 4 Drawing Sheets

MONOCHROME AND COLOR TRANSFER

In the field of pixel data processing, color type pixel data is processed independently of monochrome pixel data. During processing, the data is processed through a data processing pipeline. A data processing pipeline is a pathway over which data is transferred between components of a processing unit. The color data is transferred through a color pipeline that is divided into discrete channels, where each channel transfers a particular color therethrough. A pixel can be represented by various numbers of bits depending upon the number of colors and the number of shades per color.

For example, 24 bit color data is one example of color pixel data that can be transferred through the color pipeline. In this example, the 24 bit color data includes three colors with each color represented by 8 bits of data. The color pipeline can be designed with three channels, one for each color, and each color can be processed in a separate channel of the pipeline. The 8 bits of each color can be transferred simultaneously down the three channels and can be processed together to create the pixel.

Processing of monochrome type pixel data uses a different data processing pipeline and thus, different processing modules are provided along the monochrome pipeline to process the monochrome data before outputting the data. Since monochrome type and color type pixel data use separate processing pipelines, separate hardware is used to process the monochrome type pixel data and the color type pixel data.

Pixel data processing devices, such as scanning devices, can create pixel data in either color or monochrome data types. When the device is connected to the pixel processing components, the data type can be determined before the data is created. Since the color type and monochrome type pixel data processing components are separate physical structures, when one type of data is being processed, the processing components of the other type of data sit unused.

DETAILED DESCRIPTION

Figure 1:
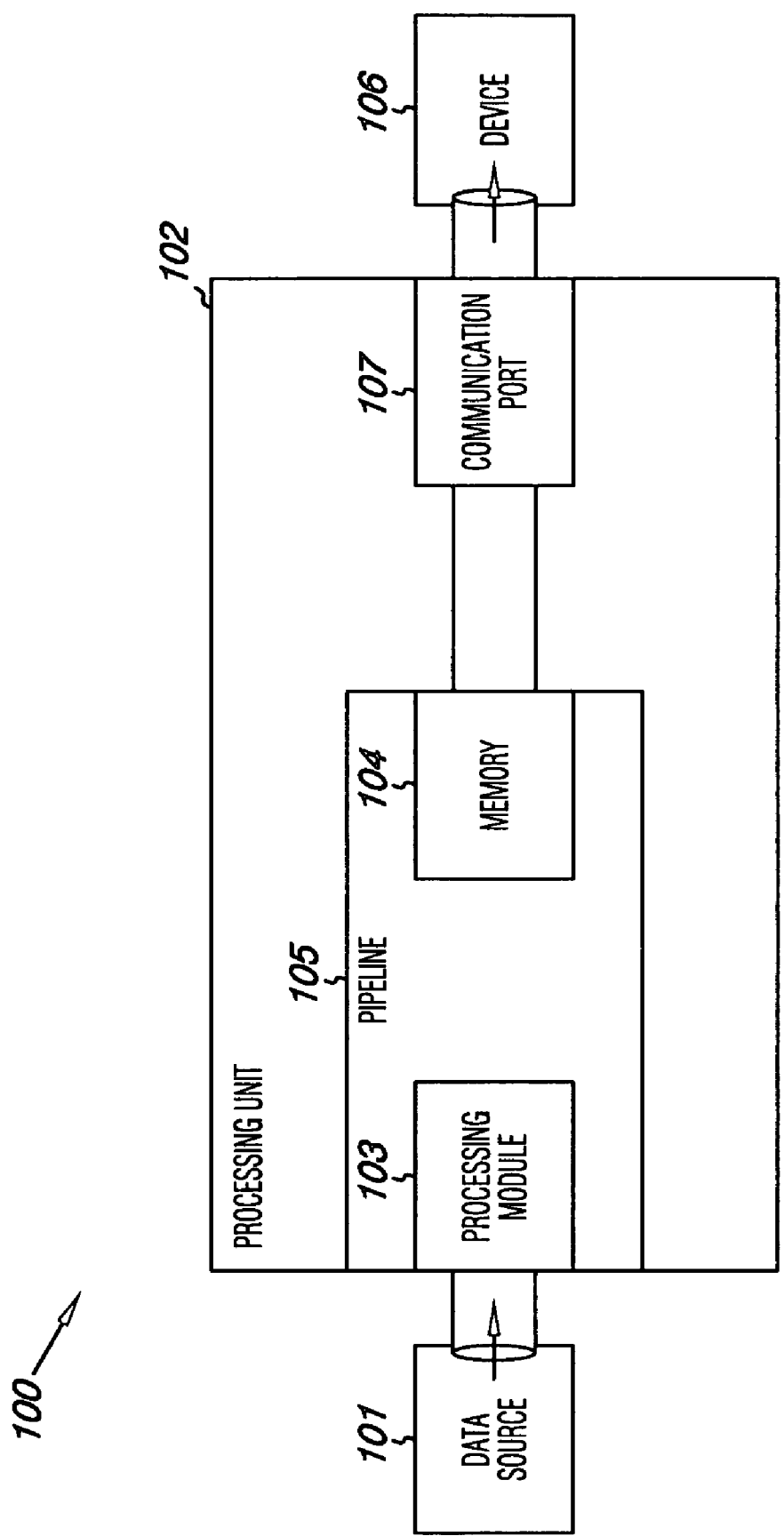
FIG. 1 illustrates an embodiment of a system for transmitting data.

Embodiments disclosed herein provide apparatuses, systems, and methods for processing monochrome type pixel data and color type pixel data using a color type pixel data pipeline. Embodiments of the present invention can allow for the color data pipeline to process both types of data and can allow for a single set of processing modules to work on both types of data. The use of the color pipeline to process both types of data can reduce hardware overhead and can thereby reduce manufacturing size and cost.

As used herein, the term "monochrome" means a color that can be represented by a single available base color and the various shades of that base color. For example, black is often available as a base color in printing devices and therefore is a monochrome color on those devices and a grayscale represents the shades of the color black. Printing devices also can include base colors such as cyan, magenta, yellow, light cyan, and light magenta, among others. These base colors would also be considered monochrome colors for such a device.

Various types of scanning devices and displays use the base colors red, green, and blue and, therefore, the monochrome colors of those devices include red, green, and blue, and the shades of those colors. Various devices also use black as a base color and therefore, black can also be a monochrome color with respect to these devices. However, the invention is not limited to the described colors or devices.

In some embodiments, the three color channels in a color type pixel data pipeline can be used to process monochrome type pixel data. In these arrangements, the speed of monochrome processing can be higher than using a single color channel in the color type pixel data pipeline to process monochrome type pixel data.

A processing unit containing processing modules and color channels can be configured to receive and process pixel data in various ways. For example, the pipeline and modules can be preset to accept either monochrome or color type data, the pipeline and modules can be set when connected to a data source such that the pipeline is configured to receive the type(s) of data output by the data source, or the pipeline and the modules can be set when the type of data is identified.

As stated above, the processing unit can, for example, be preset to process either monochrome type or color type pixel data prior to receiving such data and prior to identification of such data. For example, if the pipeline is designed for processing monochrome type pixel data, the pipeline can be configured prior to receiving the data and prior to identification of the pixel data. This configuration structure can be useful, for example, in manufacturing, where the same processing unit can be stocked for both color and monochrome devices and can be configured when it is determined what type of data it will be receiving.

The presetting of the processing unit can be achieved through use of software and/or firmware programming to provide computer executable instructions for directing the pixel data through the various channels of the pipeline and for providing the processing modules along the pipeline. For instance, registers in each module, as the same are known and understood by one of ordinary skill in the art, can include a bit set to indicate whether the module is to process the data or pass the data through the module to the next module in the pipeline. Executable instructions can read the bit to determine whether a particular module is to process the data or to bypass the data. For example, a register can have a bit value of "1" to represent that data is to be processed and can have a bit value of "0" to indicate that data is to bypass the module. The registers can be assigned a default, such as initially having a bit value of "0" for all modules. As will be described in more detail below, software and/or firmware instructions provided herein are used to identify received data as monochrome or color type data and, when appropriate, can change the bit value stored in the registers of the processing modules. In this way, the pipeline can use instructions to turn on or off monochrome and color data processing modules along the pipeline with respect to the type of data to be sent through the pipeline.

In various embodiments, the processing unit can use computer executable instructions in the form of software and/or firmware that is executable to receive data from a data source in the form of monochrome and/or color type pixel data. In such an embodiment, the processing unit includes executable instructions that can identify the received monochrome type and color type pixel data such that prior to the data entering the pipeline for processing, but after the data has been identified as monochrome or color type pixel data, firmware and/or software can determine how the data processing pipeline will process the identified data e.g., identified color type pixel data. This configuration structure can be useful, for example, with devices, such as scanning devices, that can scan both, in a monochromatic mode or in a color mode and, therefore, can provide either monochrome or color data in a data stream.

FIG. 1 illustrates an embodiment of a system 100 for processing data. In the embodiment shown in FIG. 1, the system 100 includes a data source 101 for providing pixel data to be processed, a processing unit 102, and a data destination 106 for receiving the processed pixel data. The processing unit 102 provides a processing pipeline that can be used to process both color type and monochrome type pixel data.

The data source 101 can include various data source types capable of outputting monochrome type and/or color type pixel data. For example, the data source 101 can be a device or component of a device that outputs color type pixel data and/or monochrome type pixel data such as a scanning device or computer, and can be part of a system or network.

The pixel data types output from the data source 101 can be formatted in various bit lengths. For example, monochrome type pixel data can contain 1 bit of data where the one bit represents the presence or absence of a monochrome color. In another example, 8 bits of monochrome and/or color pixel data can represent 256 values. The 8 bits can be used to provide up to 256 different colors or 256 shades of a monochrome color. Data can be provided such that each pixel uses the same number of bits, e.g., 8 bits, or such that the pixels have different bit lengths, e.g., 2, 4, 6, or 8 bits. A number of bits can be grouped together to represent a number of colors in a pixel. For example, color type pixel data can use 24 bits to represent three different base colors in a pixel with each of the three different base color values represented by 8 bits of data.

Color type pixel data can be represented according to various color space conventions. For example, various color space conventions include RGB (Red, Green, and Blue), XYZ (Commission International de l'Eclairage tristimulus specification), LAB (Luminosity, A-chromaticity layer (redgreen balance), and B-chromaticity layer (blue-yellow balance), LCH (Luminance, Chroma, and Hue), and CMYK (Cyan, Magenta, Yellow, and Black), among others.

In the embodiment shown in FIG. 1, the data processing system 100 includes at least one processing unit 102. The processing unit 102 includes a processing pipeline 105. The processing pipeline 105 can couple a number of processing modules 103, memory 104, and communication port(s) 107. Examples of the functions that processing modules can provide include color space conversion and image enhancement, among others.

The processing unit 102 can be an integrated circuit or other structure than can use software and/or firmware in conjunction with processing modules 103 to perform pixel processing operations on monochrome type and color type pixel data. For example, processing modules can include separate modules connected together or include several modules on an application specific integrated circuit (ASIC).

The processing unit 102 can execute instructions to direct pixel data to various processing modules 103 and/or to memory, such as memory 104 to perform various processing functions and to output various data to data destinations 106 via a communication port 107, such as a peripheral component interconnect (PCI) bridge.

As mentioned above, the software and/or firmware used by the processing unit 102 includes computer executable instructions to instruct various processing modules 103 in communication with the data processing pipeline 105. The instructions can direct components of the processing unit 102 to receive, process, store, or operate on, and output monochrome type pixel data and/or color type pixel data as it is transferred through the pipeline 105.

The pipeline 105 can be organized into a number of channels. For example, with color pixel type data, such as a 24 bit color data stream, the 24 bits of data can represent three different colors and can be split into three different channels with each channel receiving 8 bits of data associated with a particular color. A channel within the pipeline 105 can be used to process monochrome type data, for example 8 bits of data representing a monochrome color. Although embodiments are described in connection with the processing of pixel data, the programs and techniques for managing data in the channels of the pipeline are not limited to use with pixel data.

The processing modules 103 can process data from at least one color channel of the pipeline 105. As stated above, the processing modules 103 can include various modules such as modules having color space converters, matrixes, buffers, filters, image enhancers, color maps, tone maps, image scalers, and compression modules, among others. The monochrome type and color type pixel data can be processed via various processing modules 103.

As described in greater detail below, the number and type of processing modules 103 used can be such that various modules 103 are not used in certain situations during the processing of certain pixel data. That is, various processing modules 103 can be bypassed or passed through without processing the data.

In various embodiments, the instructions executed by the processing unit 102 can direct which processing modules 103 are to process the pixel data. Various processing modules 103 can process both color type and monochrome type pixel data and/or send the data along the pipeline. Additional examples of processing modules are discussed in more detail below with respect to FIG. 2.

Memory 104 can be resident on or connected to the processing unit 102. Memory 104 can be used to store program embodiments and processed data. Processed data can be routed from memory to data destinations such as to a data destination 106, e.g., display device. For example, the processing unit 102 can execute instructions stored in memory to receive monochrome type pixel data and/or color type pixel data after it has processed through the pipeline 105 and can transmit the monochrome and color pixel type data to a data destination 106. Memory 104 can include ROM and/or RAM, including dynamic RAM, magnetic media, and optically read media, non-volatile and writeable memory such as batterybacked memory or flash memory, or a combination of various memory types, among others.

The data destination 106 can include a monitor, a printer, or other device capable of receiving and displaying monochrome and/or color type pixel data. For example, the data destination 106 can be a printing device, such as an ink jet printer, which can receive monochrome type and/or color type pixel data from the memory 104. The data destination 106 can receive the data, for example, via a communication port 107. The data destination 106 can print the transmitted monochrome type and/or color pixel type pixel data on print media or in the form of an image on a display provided on or connected to the data destination 106.

Figure 2:
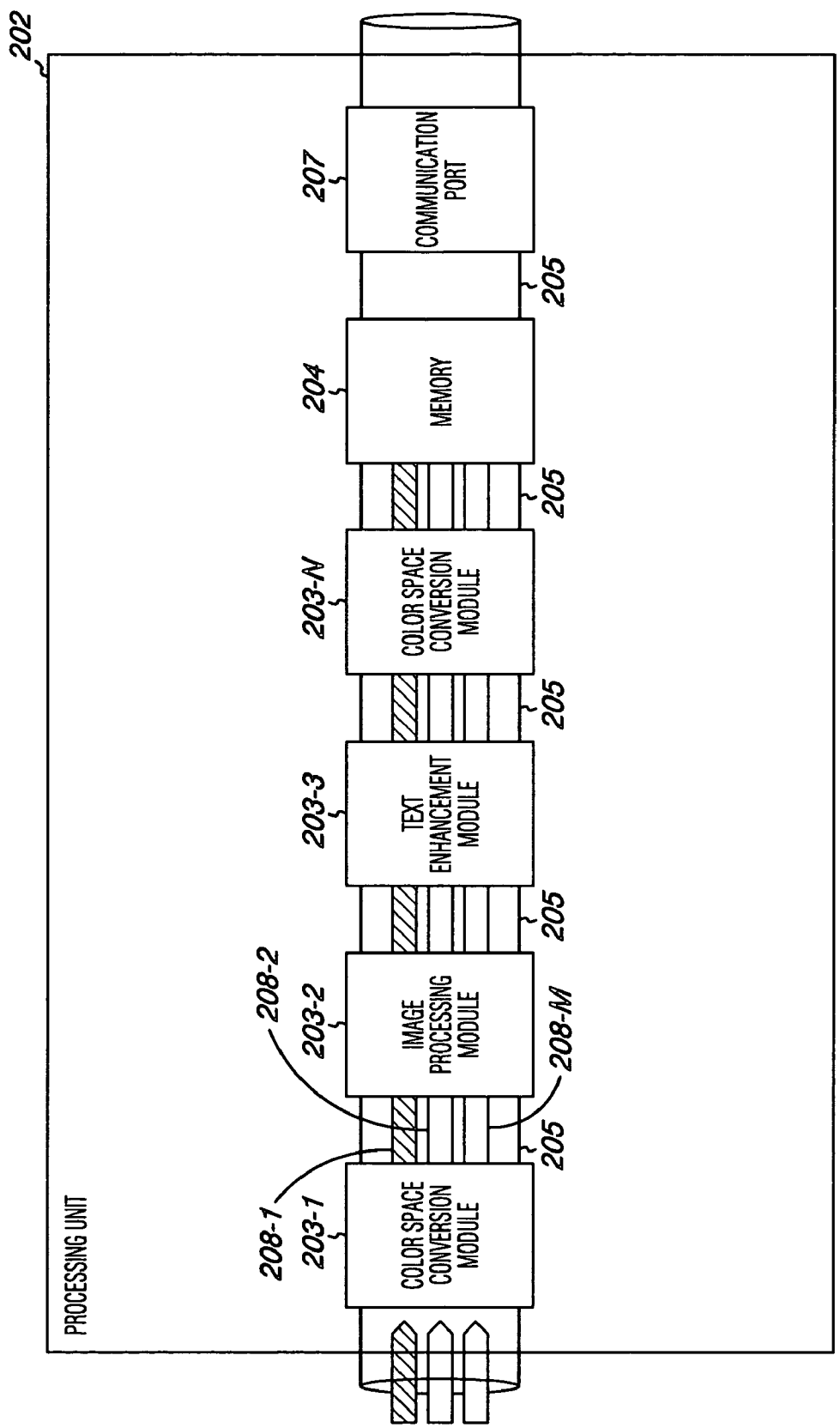
FIG. 2 illustrates an embodiment of a data processing pipeline.

FIG. 2 illustrates an embodiment of a processing unit 202 having a data processing pipeline 205. The data processing pipeline 205 can include a number of color channels shown as channels 208-1 through 208-M. The color channels 208-1 through 208-M can be used to represent different color elements within a given pixel, e.g., red, green, and blue (RGB), or Luminosity, A-layer, and B-layer (LAB) channels. Color channels 208-1 through 208-M provide pathways for various pixel data to move through the data processing pipeline 205.

In the embodiment of FIG. 2, the data processing pipeline 205 is illustrated connected to various processing modules 203-1 through 203-N. Each can be controlled by software and/or firmware. Each processing module 203-1 through 203-N can include particular computer executable instructions for processing pixel data in various manners. Such instructions can include instructions for one or both of the color type and monochrome type pixel data. The processing modules 203-1 through 203-N can execute instructions according to software and/or firmware embodiments to receive data, process data, output processed data, and/or to allow certain data to pass through unprocessed. The letters M and N have been chosen to represent that embodiments can have various numbers of channels/modules. As used herein, M can be a number identical to or different from N.

As used herein, computer executable instructions are used to process, that is to modify, filter, convert, enhance, and/or store monochrome and color type pixel data, with the various processing modules 203-1 through 203-N. For example, processing can include image and text enhancement, halftoning, image scaling, image and text sharpening, convolution, compression of the monochrome and color type pixel data, artifact removal, tone mapping, and color space conversion from one color space to another, among other pixel processing functions.

In the embodiment illustrated in FIG. 2, a data source, such as the data source 101 shown in FIG. 1, can provide pixel data, such as color type pixel data and/or monochrome type pixel data, to one or more of the processing modules 203-1 through 203-N using at least one of a number of color channels 208-1 through 208-M. According to various embodiments of the present invention, instructions can be executed by the processing unit to identify monochrome type of pixel data that is provided to the pipeline and to direct the pixel data to a particular channel.

Various program embodiments include instructions to identify and track monochrome type pixel data being placed in one or more channels of the pipeline. According to various program embodiments, the processing modules 203-1 through 203-N which are intended or appropriate for processing monochrome pixel data are signaled to receive and are provided with instructions to process the same according to the identified type of pixel data.

Likewise, if a processing module 203-1 through 203-N is not signaled and provided with instructions to process the identified data, it will pass the data through the processing module without processing it. For example, those processing modules 203-1 through 203-N containing computer executable instructions for processing color type pixel data can process the color type pixel data and can pass monochrome type pixel data through unprocessed.

In the example illustrated in FIG. 2, a processing unit contains several processing modules 203-1 to 203-N. The embodiment of FIG. 2 illustrates color space conversion modules, shown as 203-1 and 203-N, which are designed or intended to process color data. The embodiment of FIG. 2 also illustrates an image processing module and a text enhancement module 203-2 and 203-3 which are designed or intended to process both color and monochrome type data. Embodiments of the invention are not limited to these examples.

According to firmware and software embodiments, the one or more modules can be signaled or designed (e.g., preset) to bypass certain types of identified pixel data, such as monochrome data. For example, when monochrome data is processed through a particular channel of the color pipeline, the data can be passed through modules 203-1 and 203-N without being processed, while processing can occur in modules 203-2 and 203-3. When color data is processed through the pipeline, processing can occur at some or all of the modules 203-1 through 203-N. In this way, the pipeline can be used by both monochrome and color data types. The bypassing of the data can be accomplished in various ways. For example, registers can be used to place the one or more modules in a bypass mode based on firmware and/or software instruction received from the program embodiments.

The color space conversion processing modules 203-1 and 203-N can use instructions to convert the color type pixel data to a number of varying color spaces. In various embodiments, color space conversion instructions can convert data in the RGB color space to the XYZ color space, the LAB color space, or the LCH color space, among others. For example, the processing unit 202 can include a number of color space converters, such as RGB to LCH, RGB to LAB, RGB to XYZ, XYZ to LAB, XYZ to LCH, LAB to LHC, and the like. It should be understood that the invention is not limited to the color space converters listed above.

A color space conversion module, such as module 203-1 can also be used to extract monochrome data from color data. In such an embodiment, the color data, such as RGB type data, enters the module 203-1. The module 203-1 can convert the data to a different color space, such as LAB, or LHC, where one color element, such as the Luminosity element, can be used to represent monochrome data.

In the embodiment shown in FIG. 2, color space conversion processing module 203-1 can be used to convert the data into a color space that is more suitable for the various data processing steps that are to be performed. The data is then sent through processing modules 203-2 and 203-3 to perform processing, such as filter, halftoning, and text enhancement, among others.

Once processed, the data is sent to color space conversion processing module 203-N where it is converted back to its original color space format. However, the embodiments of the invention are not limited to this type of processing, or to the number or type of modules illustrated.

The data processing pipeline 205 can also include a memory 204 and PCI Bridge or other suitable communication port 207. The memory 204 can be used to receive color type pixel data and monochrome type pixel data and output the data to a device, such as the data destination 106 shown in FIG. 1.

Figure 3:
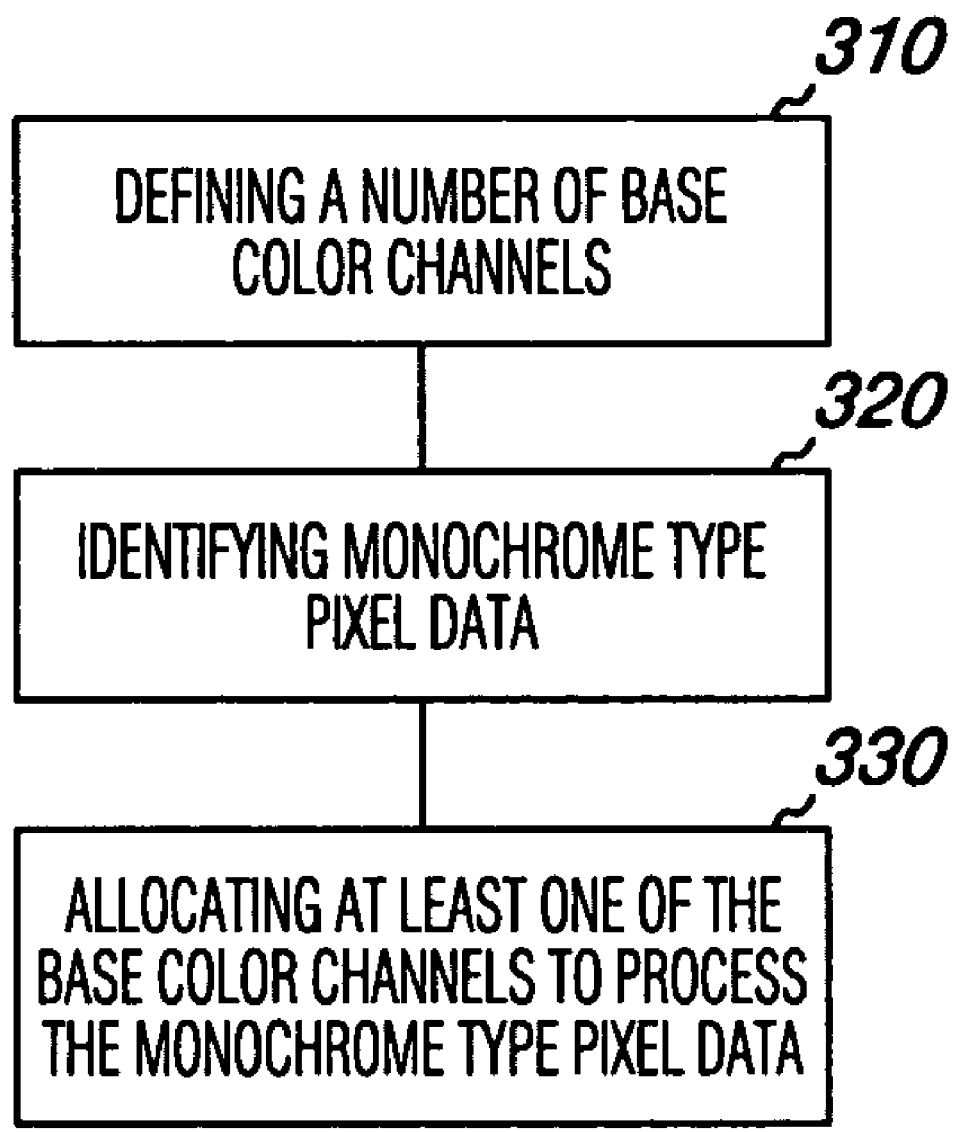
FIG. 3 illustrates a method embodiment for data processing.

FIG. 3 illustrates a method embodiment for processing data. Unless explicitly stated, the method embodiments described herein are not constrained to a particular order or sequence. Additionally, some of the described method embodiments or elements thereof can occur or be performed at the same point in time. The embodiments can be performed by programs (e.g., computer executable instructions), hardware, application modules, and the like, executable on the systems and devices shown herein or otherwise. Embodiments of the invention, however, are not limited to software written in a particular programming language. And, computer executable instructions, suitable for carrying out embodiments of the present invention, can be resident in one or more devices or locations or in many locations.

In the embodiment of FIG. 3, a method for processing data is illustrated. In block 310, the method includes defining a number of base color channels. The number of base color channels can be defined within a pipeline. The number of channels can be defined on an integrated circuit such as an application specific integrated circuit (ASIC). Each channel can be designed to process a particular color element of a stream of color type pixel data. The method also includes identifying monochrome type pixel data at block 320, e.g., program embodiments provide firmware and/or software to identify a type of pixel data such as monochrome type pixel data. As stated above, this can be accomplished before the processing unit is connected to a source, when the processing unit is connected to the source, or while the processing unit is receiving data from the source.

The embodiments of the invention can include various numbers of channels. For example, a color pixel can be formed by elements of a number of base colors available on a device, such as red, green, and blue, for a device using the RGB color space. The number of base color channels can be equal to the number of base colors available on the device. Thus, with respect to the above example, the device can be configured to have red, green, and blue color channels.

In block 330, the method includes allocating at least one channel of the defined channels for processing the monochrome type pixel data. That is, the allocated channel is at least one of the number of base color channels. The program embodiments can also execute instructions to signal processing modules in a color pipeline to receive and process a particular pixel data type or to bypass the particular type of pixel data along the pipeline. As noted above, the processing unit can be preset by firmware and/or software. For example, with respect to a device using the RGB color space and having a red data channel, a green data channel, and a blue data channel, one or more of the red, green, or blue data channels can be allocated by the firmware and/or software to transfer monochrome data along the pipeline.

The following example, with respect to devices using the LAB or LCH color spaces is provided. Embodiments, however, are not limited to this example. The firmware and/or software program embodiments can allocate one or more of the L, A, B or L, C, H channels to process monochrome data. In this way, the base color channels defined for processing of color pixel data can be shared to also provide a pipeline for the processing of monochrome pixel data. Once allocated, the monochrome data can be transferred through one or more allocated channels that has been chosen to transfer the monochrome data. In some embodiments, the monochrome data can be allocated by the firmware and/or software embodiments to a particular one of the defined number of base color channels, e.g., the L channel.

As mentioned above, a number of processing modules are provided along the defined number of base color channels to process pixel data. As such, the methods include using the processing module as enabled or signaled, preset, or otherwise, to process the identified monochrome type pixel data. As discussed above, one or more of the processing modules defined along at least one of the base color channels can be bypassed. The processing modules can be designed to process one or both of monochrome and color types of data.

Figure 4:
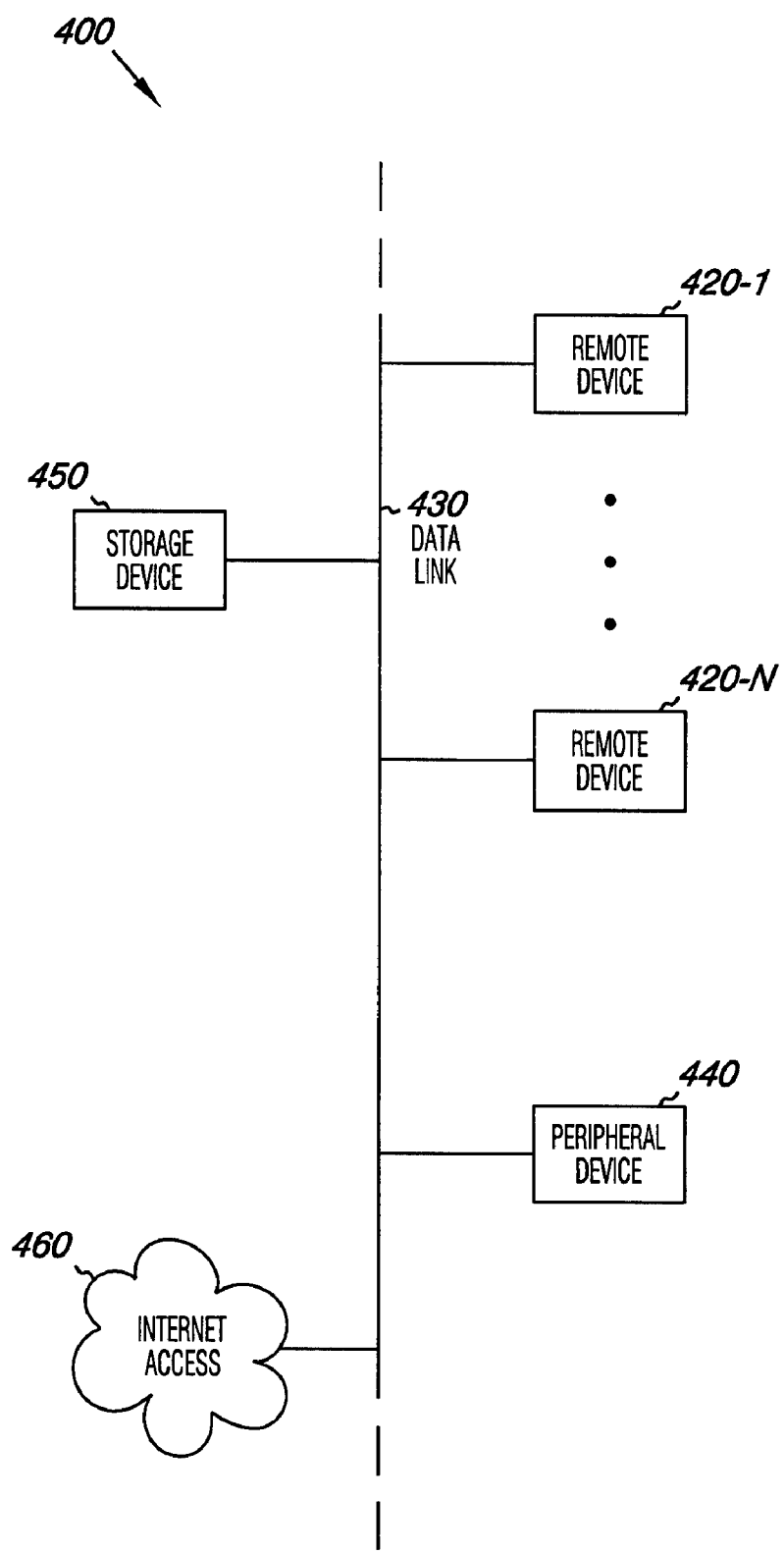
FIG. 4 illustrates an embodiment of a system having a color type pixel data pipeline.

FIG. 4 illustrates a system environment in which an embodiment of a data processing pipeline as described herein can be included. The system 400 includes a number of remote devices 420-1 to 420-N, data links 430, peripheral devices 440, storage devices 450, and an Internet access 460.

A processing unit, such as that shown and described above, can be resident on one or more of the components of the system. By way of example and not by way of limitation, a peripheral device 430, e.g., a printing device, can include a processing unit therein, such as in the form of an ASIC. A processing unit can be resident on a remote device, such as 420-1 and can receive data from another remote device, a peripheral device, a storage device, or a device via the Internet. The data source can also be on the same device as the processing unit, e.g., processing unit and source both on remote device 420-1.

The number of data links 430 can include one or more physical connections, one or more wireless connections, and/or any combination thereof. The system environment shown in FIG. 4 can include any number of system types including, but not limited to, a Local Area Network (LAN), a Wide Area Network (WAN), a Personal Area Network (PAN), and a Wireless-Fidelity (Wi-Fi) network, among others. These data links 430 can allow for pixel data to be sent and received by one or more components before or after the data has been processed.

The remote devices, 420-1 to 420-N, can include one or more desktop computers, laptop computers, workstations, servers, hand held devices (e.g., a wireless phone, a personal digital assistant (PDA)), or other devices that can send and/or receive pixel data. As illustrated in FIG. 4, the device can further be connected to other peripheral devices 440, such as scanning devices or fax capable devices, among others, that can send data to or receive data from the processing unit 402.

The system 400 can also include a storage device 450 that can be used to store data to be processed, during processing, and/or data that has been processed. Memory 104 of FIG. 1 can be provided by a storage device such as storage device 450. The system 400 can also include Internet access 460 for access to additional remote and peripheral devices. Remote devices 420-1 to 420-N, peripheral devices 440, storage devices 450, and other such devices accessed via the Internet access 460, can be used as data sources 101 and/or devices 106 as described with respect to FIG. 1.

Although specific embodiments have been illustrated and described herein, it is to be understood that the above description has been made in an illustrative fashion and not a restrictive one. Embodiments of the invention may include other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter may lie in less than all features of a single disclosed embodiment.

What is claimed:

1. A method for processing data, comprising:
defining a number of color channels, each channel to transfer a particular color element of a stream of color type pixel data;
identifying monochrome type pixel data within a data stream that can be represented by a single monochrome base color and shades of the base color; and
allocating more than one color channel to transfer the identified monochrome type pixel data,
wherein defining the number of color channels includes defining a red data channel, a green data channel, and a blue data channel,
wherein allocating the more than one color channel includes allocating the red data channel to transfer the identified monochrome type pixel data.

2. The method of claim 1, wherein the number of color channels equals a number of colors available on a device.

3. The method of claim 1, wherein a number of color channels available on a device are allocated to transfer the identified monochrome type pixel data.

4. A method for processing pixel data, comprising:
sharing a color channel to transfer monochrome type pixel data and color type pixel data;
identifying monochrome type pixel data within a data stream; and
transferring the identified monochrome type pixel data through the shared channel, wherein sharing a color channel includes sharing a channel selected from a red channel, a green channel, and a blue channel, wherein transferring the identified monochrome type pixel data includes transferring the monochrome and color type pixel data in the red channel and the blue channel.

5. The method of claim 4, further including sharing a channel selected from a Luminosity channel, an A-layer channel, and a B-layer channel.

6. The method of claim 4, further including sharing a channel selected from a Luminosity channel, a Chroma channel, and a Hue channel.

7. A computer storage medium having a set of computer executable instructions for causing a device to perform a method, comprising:
   defining a number of color channels, each channel to transfer a particular color element of a stream of color type pixel data;
   identifying monochrome type pixel data within a data stream that can be represented by a single monochrome base color and the shades of the base color; and
   allocating more than one color channel to transfer the identified monochrome type pixel data,
   wherein the method further comprises bypassing processing of identified monochrome type pixel data in a processing module along a color channel allocated to transfer the identified monochrome type pixel data.

8. The medium of claim 7, wherein bypassing includes processing monochrome type pixel data with the processing module.

9. The medium of claim 7, wherein the method further comprises processing color type pixel data, transferred through the number of color channels, with a processing module along a color channel.

10. The medium of claim 7, wherein the method further comprises defining a Luminosity channel, an A-layer channel, and a B-layer channel.

11. The medium of claim 7, wherein the method further comprises defining a Luminosity channel, a Chroma channel, and a Hue channel.

12. The medium of claim 11, wherein the method further comprises allocating the Luminosity channel to transfer monochrome type pixel data.

13. An image processing unit, comprising:
   an application specific integrated circuit having a color pipeline to transfer monochrome and color type pixel data;
   a first channel in the color pipeline to transfer both monochrome type pixel data, which can be represented by a single monochrome base color and the shades of the base color, and a first color type pixel data;
   a second channel in the color pipeline to transfer both the monochrome type pixel data and a second color type pixel data; and
   a number of processing modules connected to the color pipeline, wherein at least one of the processing modules processes the monochrome type pixel data and wherein at least one of the processing modules processes color type pixel data.

14. The image processing unit of claim 13, further including a processing module to process both monochrome type and the color type pixel data.

15. The image processing unit of claim 14, wherein one or more processing modules can be bypassed based upon a type of pixel data to be processed.

16. A data processing system, comprising:
   a processing unit having a number of color type pixel processing channels;
   means for identifying monochrome type pixel data that can be represented by a single monochrome base color and the shades of the base color; and
   means for allocating more than one color type pixel processing channel to transfer the identified monochrome type pixel data, including a first processing channel for transferring both monochrome type pixel data and a first color type pixel data, and a second processing channel for transferring both monochrome type pixel data and a second color type pixel data.

17. The data processing system of claim 16, wherein the means for identifying includes a computer readable medium having a set of computer executable instructions to identify monochrome type pixel data in a data stream.

18. The data processing system of claim 16, wherein the means for allocating includes a computer readable medium having a set of computer executable instructions to allocate at least one of the color type pixel processing channels to transfer the identified monochrome type pixel data.

19. The data processing system of claim 18, further including a computer readable medium having a set of computer executable instructions to preset a number of processing modules to process monochrome type pixel data and bypass color type pixel data through the processing unit unprocessed.

20. A data processing system, comprising:
   a data source to provide a number of types of pixel data;
   a processing unit coupled to the data source, the processing unit having a pipeline to perform pixel processing operations on at least one monochrome type pixel data and color type pixel data, wherein the processing unit transfers the at least one monochrome type pixel data and color type pixel data in more than one channel defined within the pipeline and processes the monochrome type pixel data with a number of processing modules connected to a defined channel, the more than one channel including a first channel to transfer both monochrome type pixel data and a first color type pixel data, and a second channel to transfer both monochrome type pixel data and a second color type pixel data; and
   a destination device for receiving processed data from the processing unit.

21. The data processing system of claim 20, wherein the processing unit can receive at least one of the number of types of pixel data and wherein the processing unit can be set to process the number of types of pixel data based upon identification of the type of pixel data to be received by the processing unit.

22. The data processing system of claim 20, the system further includes a memory for storing processed data received from the pipeline.

23. The data processing system of claim 22, wherein the destination device includes a display to receive and display processed pixel data.

24. The data processing system of claim 20, wherein the destination device includes a printer to receive and print processed pixel data.

* * * * *